United States Patent

Kirsch

[11] 4,100,524
[45] Jul. 11, 1978

[54] ELECTRICAL TRANSDUCER AND METHOD OF MAKING

[75] Inventor: Thomas Kirsch, Oxnard, Calif.

[73] Assignee: Gould Inc., Cleveland, Ohio

[21] Appl. No.: 683,714

[22] Filed: May 6, 1976

[51] Int. Cl.² .............................................. G01L 1/22
[52] U.S. Cl. ........................................... 338/2; 338/5; 338/308; 252/513; 252/518; 252/519
[58] Field of Search ................. 338/2, 5, 308; 75/232; 252/518, 519, 513

[56] References Cited

U.S. PATENT DOCUMENTS

| 3,202,951 | 8/1965 | Krinsky ...................................... 338/2 |
| 3,498,832 | 3/1970 | Wilson ................................... 252/518 |
| 3,533,760 | 10/1970 | Wiezenbach et al. ............. 75/206 X |
| 3,922,705 | 11/1975 | Yerman ................................. 338/2 X |
| 3,969,278 | 7/1976 | Aksenov et al. ................... 75/232 X |
| 4,016,644 | 4/1977 | Kurtz ..................................... 338/2 X |

Primary Examiner—Benjamin R. Padgett
Assistant Examiner—Josephine L. Barr
Attorney, Agent, or Firm—George J. Netter

[57] ABSTRACT

A cermet composition useful in the form of a thin-film as a strain gage consists of 65%–70% by weight chromium, 18%–32% by weight silicon monoxide, and 3%–12% by weight nickel, deposited by vacuum evaporation. After initial deposition, vacuum annealing is accomplished, or, if a more positive TCR and TSS is required, the annealing can be repeated at a higher temperature.

6 Claims, 1 Drawing Figure

U.S. Patent
July 11, 1978
4,100,524
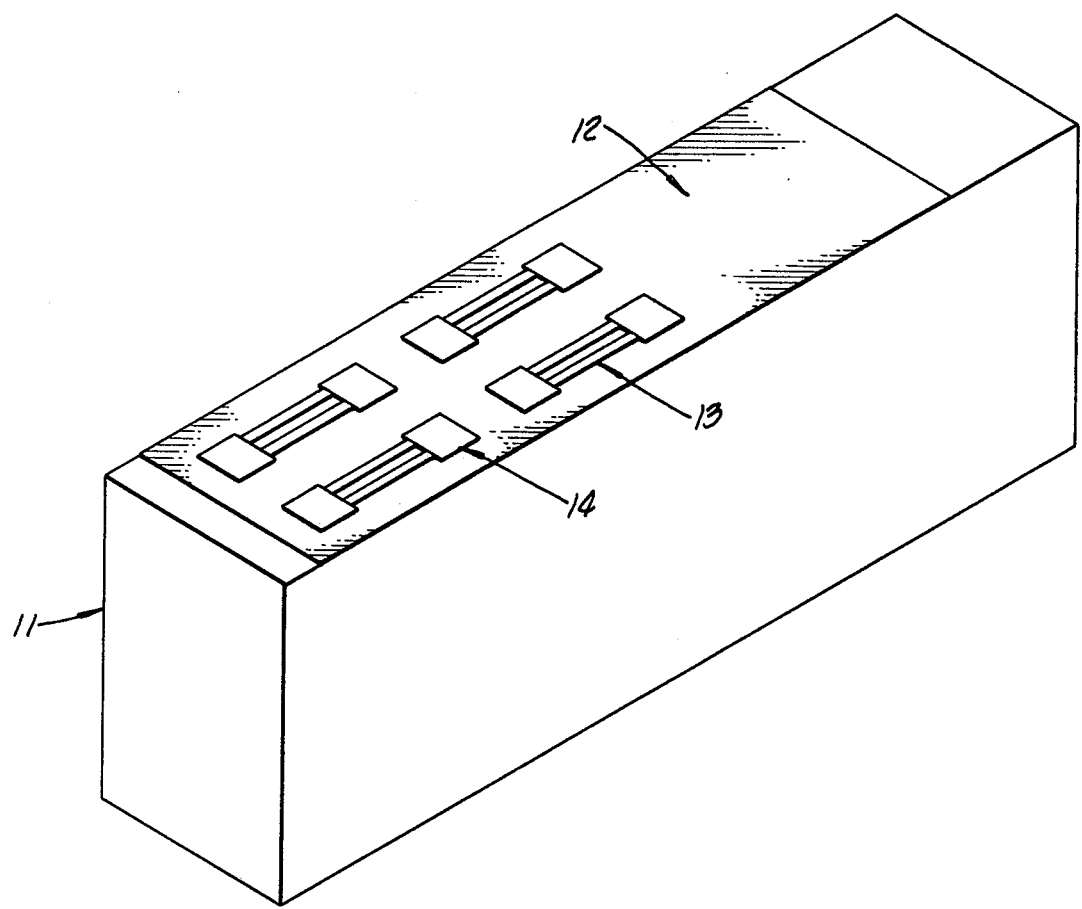

ELECTRICAL TRANSDUCER AND METHOD OF MAKING

The present invention relates generally to an electrical transducer, and, more particularly, to a thin-film deposited resistor for use as a strain gage and method of making the same.

BACKGROUND OF THE INVENTION

Strain gages are employed as a basic movement-electric signal transducer in devices for measuring force, pressure and flexure, to name only a few. Although metals (e.g., chromium) were primarily relied upon at first, semiconductor materials offer certain advantages thereover, such as greater gage factor and smaller size. The temperature characteristics of semiconductors have made them not completely satisfactory, however, for precision strain gage applications.

In a frequently encountered manner of use, the strain gage is electrically arranged as a bridge (e.g., Wheatstone bridge), and it is important that a positive thermal sensitivity shift (TSS) be maintained. Moreover, it is desirable to be able to control the temperature coefficient of resistance (TCR) of the gage material within a narrow range.

SUMMARY OF THE INVENTION

In accordance with the present invention, there has been found a composition especially useful in the form of a thin film deposited strain gage. This composition, sometimes referred to as a "cermet", consists of 65%–70% by weight chromium, 18%–32% by weight silicon monixide, and 3%–12% by weight nickel deposited by vacuum evaporation. After initial deposition, vacuum annealing is accomplished, or, if a more positive TCR and TSS is required, the annealing can be repeated at a higher temperature.

DESCRIPTION OF THE DRAWING

The drawing shows a sectional, elevational view of a strain gage transducer made in accordance with this invention.

DESCRIPTION OF A PREFERRED EMBODIMENT

Referring now to the drawing, there is shown a typical strain gage enumerated generally as at 10. Specifically, the strain gage includes a substrate 11 of a heat-treated stainless steel, for example, onto a major surface of which there is deposited an insulating layer 12 of silicon monoxide (SiO). Next, an electrical resistance 13, having the composition to be described herein, is vacuum deposited onto the SiO layer. Lead pads 14 of chromium for completing electrical connection to the resistor 13 are also vacuum deposited. Finally, the entire assembly is annealed to provide a strain gage having the desired temperature coefficient of resistance (TCR) and a positive thermal sensitivity shift (TSS).

The sensitivity of a stain gage, which essentially is measured as the output voltage obtained for a given driving voltage on stressing of the gage, can be expected to change with a change of temperature of the gage. The compensating circuit associated with a strain gage can readily counteract any positive (increasing) changes or shifts in sensivity resulting from temperature variations, but it is difficult to accomplish linearly for negative shifts. Accordingly, it is important that any material contemplated for use as a strain gage have a positive sensitivity shift on temperature increase to be practically useful.

The strain gage composition of this invention is an alloy of a ceramic material and metal which is sometimes referred to by the term "cermet". Specifically, best results have been obtained to date with a deposited film having the following composition, by weight: 65% Cr, 25% SiO and 10% Ni.

I have also found that a strain gage having a TCR controllable within a narrow range ($-20$ PPM/°C. to $+20$ PPM/°C.) and a positive TSS is obtained with a cermet having the following composition range by weight: 65%–70% Cr; 18%–32% SiO; 3%–12% Ni.

It had been considered that a two-component cermet of chromium and silicon monoxide might have the desired properties for general use as a strain gage. However, it was found that although a strain gage bridge made of Cr/SiO in the ratio of 2.5/1 had a positive TCR and positive TSS, the TCR was much too positive for use where a low TCR was required.

It was discovered, however, that by adding nickel to the Cr/SiO material, the TCR could be controllably reduced (made less positive) without driving the TSS negative.

After deposition and prior to annealing, a strain gage made of the three-component alloy described herein or merely of Cr/SiO, both have a negative TCR and a negative TSS. During annealing (typically at 805° F.) the two materials react differently. For example, the Cr/SiO formula gages on annealing experience a positive increase of the TCR, while the TSS either remains the same or decreases (i.e., becomes even more negative). The three-component strain gage of this invention, on the other hand, experiences a positive change of both the TCR and TSS. It is this characteristic of the positively moving TCR and TSS on annealing that provides the desirable capability of this invention of controlling the TCR closely without rendering the strain gage unusable as a result of a negative TSS.

In the event that after vacuum annealing at 805° F. the TCR is found to be insufficiently positive, further annealing at temperatures up to 950° F. will provide a more positive TCR and more positive TSS. In contradistinction, the two-component resistance material (Cr/SiO) on annealing at the higher temperature shows an increase in the TCR, but in most cases also produces a negative movement of the TSS.

I claim:

1. A cermet for use as an electric current conducting element consisting essentially of, by weight, 65%–70% chromium, 18%–32% silicon monoxide, and 3%–12% nickel.

2. A strain gage, comprising:
   an electrically conductive substrate;
   an insulating layer on said substrate; and
   an electrical current conducting element on said insulating layer consisting essentially of 65%–70% by weight of chromium, 18%–32% by weight of silicon monoxide and 3%–12% by weight of nickel.

3. A strain gage as in claim 2, in which the substrate consists essentially of stainless steel.

4. A strain gage as in claim 2, in which the insulating layer consists essentially of silicon monoxide.

5. A strain gage as in claim 2, in which the substrate is constructed of a stainless steel and the insulating layer consists essentially of silicon monoxide.

6. A strain gage as in claim 2, in which the insulating layer and the electrical current conducting element are evaporation deposited films.

* * * * *